US 6,747,366 B2

(12) United States Patent
Juntunen et al.

(10) Patent No.: US 6,747,366 B2
(45) Date of Patent: Jun. 8, 2004

(54) CURRENT DISTRIBUTION SYSTEM FOR A VEHICLE

(75) Inventors: Asko Juntunen, Oulu (FI); Lauri Lamberg, Hyvinkaa (FI); Jorma Pohjola, Varjakka (FI)

(73) Assignee: IWS International Oy, Oulu (FI)

( * ) Notice: Subject to any disclaimer, the term of this patent is extended or adjusted under 35 U.S.C. 154(b) by 75 days.

(21) Appl. No.: 10/181,047

(22) PCT Filed: Jan. 4, 2001

(86) PCT No.: PCT/FI01/00010

§ 371 (c)(1),
(2), (4) Date: Oct. 21, 2002

(87) PCT Pub. No.: WO01/49532

PCT Pub. Date: Jul. 12, 2001

(65) Prior Publication Data

US 2003/0090152 A1 May 15, 2003

(30) Foreign Application Priority Data

Jan. 5, 2000 (FI) ............................................. 20000020
Sep. 19, 2000 (FI) ............................................. 20002061

(51) Int. Cl.⁷ ............................................. B60R 16/02
(52) U.S. Cl. ..................................................... 307/10.1
(58) Field of Search ................................. 307/10.1, 9.1, 307/38, 39, 41; 320/104

(56) References Cited

U.S. PATENT DOCUMENTS 6,067,612 A * 5/2000 Sasaki et al. ................. 712/28
6,469,404 B1 * 10/2002 Pohjola ....................... 307/10.1
6,553,039 B1 * 4/2003 Huber et al. ................. 370/466

FOREIGN PATENT DOCUMENTS

| DE | 19730319 A1 | 1/1998 |
| EP | 0890906 A3 | 1/1999 |
| WO | WO 99/26331 | 5/1999 |

* cited by examiner

Primary Examiner—Pia Tibbits
(74) Attorney, Agent, or Firm—Davidson, Davidson & Kappel, LLC

(57) ABSTRACT

A current distribution system for a vehicle, wherein a high-level data bus (9') and a low-level data bus (9) are consistent with different protocols and are in a data transfer communication with each other by way of an adapter (3). Intelligent nodes (19) associated with at least the low-level data bus (9) are provided with a standard kernel software and with node-specific configuration files, whereby the kernel software is adapted to represent the desired functions of a node, including the reception and transmission of control messages, as well as a controlled current supply to electrical devices (20) in a vehicle. The node configuration files are stored as a system configuration in the adapter (3), from which a proper node configuration file can be loaded into a given node (19).

11 Claims, 2 Drawing Sheets

CURRENT DISTRIBUTION SYSTEM FOR A VEHICLE

BACKGROUND OF THE INVENTION

The invention relates to a current distribution system for a vehicle of the type defined in the preamble of claim 1.

A similar type of current distribution system has been described in the Applicants' international patent applications WO 99/25585 and WO 99/25586. These prior known systems comprise a standard node software, and an individually loadable node configuration which singles out functions controlled by the node software. This very principle is exploited in the present invention in order to enable the building of systems of varying functions on an automated production line, e.g. alongside a vehicle production line, from standard components.

A problem in deploying the above-mentioned prior known systems has proved to be the fact that the vehicle manufacturer may already have a pre-existing intelligent current distribution system in relation to certain system segments, such as a display and the control and diagnostics of an engine and fuel feeding, the intelligent nodes thereof communicating with each other or with a central control unit in accordance with a certain protocol, e.g. a CAN protocol. Generally, however, these systems consist of independent electronic modules, which have nothing to do with each other. In addition to this, a vehicle is usually provided with a multitude of power consuming actuators, such as all lights, motors for windshield wipers and window controls, as well as for sideview mirror controls, rear window defoggers and seat heaters, etc. The information packages used for the control and fault diagnostics of these actuators can be simpler and have a lower frequency than that of the protocol used by vehicle manufacturers, the use of simpler information packages in the system as extensively as possible for the control of power distribution reducing congestion and susceptibility to faults in communication.

Furthermore, it is necessary to reserve a possibility of changes (updates) in the control of power distribution.

SUMMARY OF THE INVENTION

It is an object of the invention to provide a power distribution system, wherein a system segment or segments used by a vehicle manufacturer can be integrated as a functional entity with such an intelligent current distribution system which, although provided with a different type of data transfer protocol, controls power distribution to vehicular actuators and which continues to maintain a flexible possibility of producing systems of varying functions.

This object is achieved by the invention on the basis of the characterizing features set forth in the annexed claim 1.

Hence, in a system of the invention, the separate system segments are provided with data transfer protocols different from each other. Thus, the information packages of a first, so-called lower-level data transfer protocol may be sufficiently simple and/or have a low frequency for a reduced susceptibility to faults, while avoiding a congestion of communications in a second, so-called higher-level system segment.

Moreover, the inventive system includes an adapter, which is used for the configuration of at least lower-level nodes and for storing and loading the configuration data. The adapter may also be utilized for the rationalization of production in a higher-level system segment by using the adapter also for the configuration of higher-level intelligent nodes and for storing and loading the node configurations, as will be specified hereinafter.

BRIEF DESCRIPTION OF THE DRAWINGS

One exemplary embodiment of the invention will now be described in more detail with reference to the accompanying drawings, in which.

DETAILED DESCRIPTION OF THE INVENTION

Figure 1:
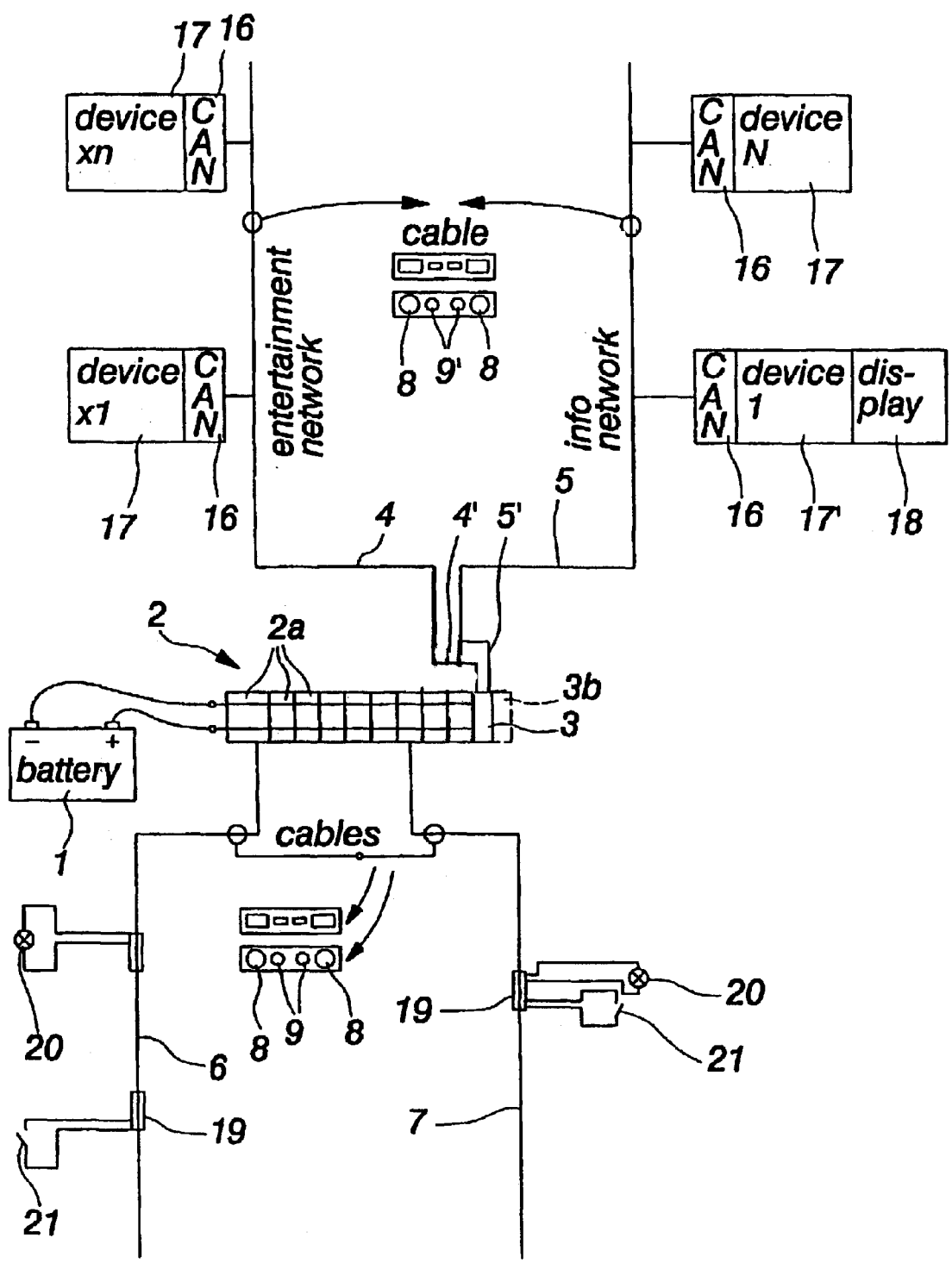
FIG. 1 shows a current distribution system of the invention in a block diagram.
Figure 2:
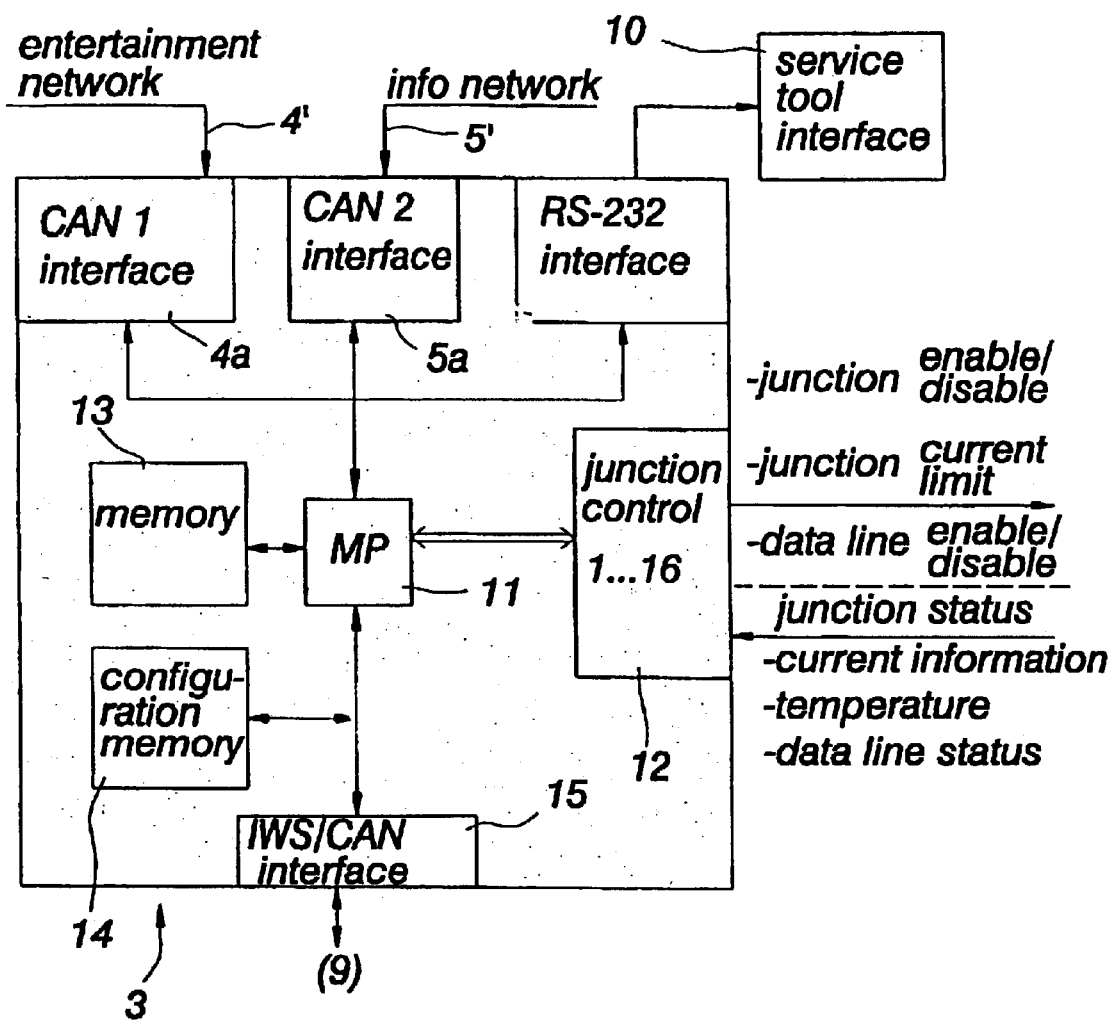
FIG. 2 shows a block diagram for an adapter included in the system.

In the block diagram of FIG. 1, an adapter 3 divides a current-distribution controlling system into two subsystems, wherein data transfer may be based on various protocols. In the present case, the system segment above the adapter 3 is depicted as being provided with a CAN protocol commonly used by vehicle manufacturers, and the system segment below the adapter 3 is provided with some other protocol, which is simplified in terms of its information packages and has a lower frequency and which in this specification is referred to as an IWS protocol (Intelligent Wiring System). The IWS protocol may also be a data transfer protocol with a totally different nature, which is not based on bit strings but, instead, on delay times between transient variations, as described in the Applicants' patent application FI-19991911.

From a current source 1 the current is supplied to a current feeding unit 2, provided with a connection module 2a for each cable branch. By way of the connection modules 2a and cables 4, 5 the current and control data are delivered to high-level protocol devices 17 under the control of intelligent nodes 16. The cable 4, 5 includes separately current conductors 8 and data conductors 9'. The same data bus 9' is also fitted with a display driver 17' and a display 18. The same data bus 9' may have connected therewith any number of devices 17 used by various vehicle manufacturers, which may be e.g. measuring sensors or special equipment in relation to the diagnostics or engine operation and running control. These devices 17 are connected to the high-level communication line 9' by way of intelligent nodes 16. The intelligent nodes 16 included in the high-level system segment are depicted in association with the devices and connected with intermediate wires to cable conductors as conventional in modern practice, but such nodes may also connect directly to the conductors 8, 9' of the cables 4, 5. The intelligent nodes 16 are in a conventional manner provided with electronic current switches and a preprogrammed intelligence for controlling the same.

The low-level system segment includes a necessary number of cables branches 6, 7 for feeding a current from a current source 1 to low-level actuators 20. These actuators 20 are supplied with a current by intelligent nodes 19 which are attached directly to the cables 6, 7, as described more specifically e.g. in the publication WO 99/25585. The nodes 19 are provided with power pins which pierce current conductors 8 and data pins which pierce data conductors 9. Naturally, other types of cable jointing are also possible. In addition, the nodes 19 may have input connectors thereof provided with input devices, such as input switches 21, for controlling primarily the low-level actuators 20 but, if necessary, also some of the high-level actuators 17. Such control messages must carry an indication or address, on the basis of which the adapter 3 accepts a message for reception and to be converted in such way that the message can be delivered to the high-level data bus. The control delivered by the switch 21 may be applied either to an actuator 20 present in the same node 19 that includes the switch 21 or the control may be applied to an actuator 20 (17) present in any of the low-level (or high-level) cable branches.

The ends of the cable branches 6, 7 connect to junction modules 21, which are coupled to each other for a current supply to the current conductors 8 of all cable branches 4–7 and for joining the data lines 9 of the low-level cable branches 6, 7 for a common data bus. Thus, the nodes 19 of various cable branches 6, 7 are in a direct communication link with each other. This data transfer protocol (IWS) may be in any appropriate manner different from the high-level protocol (CAN).

The processors of all low-level nodes 19 are controlled by a standard kernel software, a so-called node software. In order to enable the node software of each individual node 19 to comply with the desired functions of this particular node, each node 19 has its flash memory stored with a node configuration file. Thus, the system includes several node configurations, each containing configuration data for a single node. All node configurations together constitute a so-called system configuration, which is stored in a configuration memory 14 of the adapter 3.

In connection with manufacturing the cable branches 6, 7, the node configuration files can be stored in the processor memories of the nodes 19. When a vehicle is started for the first time, the node configuration files of all nodes 19 are adapted to be loaded from the nodes 19 into the memory 14 of the adapter 3 for constituting together said system configuration therein. The adapter 3 performs periodically the comparison of the node configuration files of the nodes 19 with node configuration files present in its memory. If any one of the nodes 19 lacks a node configuration file, e.g. when a defective node has been replaced with a new one, the adapter 3 shall load a node configuration file into such node. On the other hand, if the node configuration file is different from that of the adapter possibly updated by way of a service interface 10, the adapter 3 shall load a new updated node configuration file to replace the old one. Thus, the system is easy to operate in terms of its service and updates. In connection with manufacture, it is not necessary to load the nodes 19 with node configuration files as these can be loaded in connection with a first startup from the system configuration present in the memory 14 of the adapter 3. Thus, the adapter 3 is provided with an external service tool interface 10. Thereby, the loading of a configuration can be performed into the adapter or the configuration can be modified e.g. by way of a customer's network interface (CAN or RS or other).

Through the adapter 3 the high-level data bus 9' and the low-level data bus 9 are in a data transfer communication with each other. Therefor, the adapter 3 includes a microprocessor 11 and a program stored in its memory 13, which functions as a protocol interpreter i.e. converts the data of the second protocol (IWS) to the data of the first protocol (CAN) and/or vice versa, depending on whether the direction of data transfer is from the low-level data bus 9 to the high-level data bus 9' or vice versa. The data lines 9' of the high-level cable branches 4, 5 connect by way of lines 4', 5' to cable-branch specific interfaces 4a, 5a. On the other hand, the data lines 9 of all low-level cables branches connect to a common interface 15 on the adapter 3.

Moreover, the adapter 3 is provided with a control and monitoring unit 12 for the junction modules 2a, which controls switches present in the junction modules for enabling and disabling a current supply to the cable branches, sets cable-branch specific current limits, connects or disconnects the cable-branch specific data lines 9 to or from the bus, respectively, and monitors a status of the cable branches, such as a current taken up by a cable branch, a temperature of current switches, and a data line status.

The above-described principle, wherein the standard kernel softwares of node processors are adapted by means of node configurations to match the desired functions of the nodes, can be applied also in regard to the high-level nodes 16. In this respect, it is also possible to exploit the storing of high-level node configurations in the adapter 3, wherefrom the same can be loaded into the nodes e.g. as a defective node is replaced with a new one or as the configuration of any of the nodes is modified to represent new functions.

Since various operating conditions, such as those encountered in testing or servicing the system or in connection with a failure of the system, require the nodes or sockets to perform various functions, it is preferred that, at least in some of the nodes 19, each individual node be provided with several node configurations which are consistent with various function modes of the system. The most typical function modes are as follows: a normal condition function mode, a test function mode, an abnormal condition function mode, a service condition function mode, and a 00-function mode in which the node does nothing until a command comes from the adapter 3. Since the low-level nodes 19 are provided with connecting pins for clamping with a cable C2 and, as the same function also as a socket for a hardware cable terminal, such nodes 19 can also be referred to as sockets.

By means of a parallel adapter 3b, the system is further provided with a back-up feature. The meaning of this is, hence, that the two parallel adapters 3 and 3b are provided with identical functions and memories. Just one of the adapters is active. If the active adapter fails, the other is able to undertake the functions. The back-up adapter 3b notices when the presumably active adapter 3 does not transmit a message regularly.

What is claimed is:

1. A current distribution system for a vehicle, comprising
a current source (1);
a first cable (4, 5) for feeding a current from the current source (1) to first-level devices (17);
a first number of intelligent nodes (16) between the first cable (4, 5) and the first-level devices (17);
a first data bus (9'), which constitutes a communication link according to a second protocol with said first intelligent nodes (16);
wherein the system additionally comprises
a second cable (6, 7) for feeding a current from the current source (1) to second-level actuators (20);
a second number of intelligent nodes (19) between the second cable (6, 7) and the second-level actuators (20) for guiding the current supply to the actuators;
a second data bus (9), which constitutes a communication link according to a second protocol between said second intelligent nodes (19);
a node software, which comprises a standard kernel software controlling processors present in the nodes of at least the second number of nodes (19);
a plurality of node configurations, each containing configuration data for an individual node (19), which is stored as node configuration files in each node and by which the node software of each individual node (19) is adapted to match the desired functions of the node (19); and an adapter (3), by which the first data bus (9') and the second data bus (C9) are in a communication link with each other and which has a memory (14) for storing said node configuration files therein as a system configuration, from which a proper node configuration file can be loaded into a given node (19).

2. A system as set forth in claim 1, wherein, as a vehicle is started for the first time, the node configuration files present in the nodes (19) of at least said second number of nodes are adapted to be loaded from the nodes (19) into the memory (14) of the adapter (3).

3. A system as set forth in claim 1, wherein the adapter (3) periodically performs a verification of the node configuration files of the nodes (19) in relation to the nodes configuration files present in its memory (14) and loads a node configuration file into such a node (19), which lacks a node configuration file or which has a node configuration file different from the possibly updated node configuration file of the adapter (3).

4. A system as set forth in claim 1, wherein the adapter (3) converts the data according to a second protocol (IWS) to the data according to a first protocol (CAN) and/or vice versa, depending on whether the direction of data transfer is from the second data bus (9) to the first (9') or vice versa.

5. A system as set of the in claim 1, wherein the nodes (14) associated with a system display (18) and the diagnostics sensors (17) for engine operation are included in said first number of nodes connected to said first data bus (9').

6. A system as set forth in claim 4, wherein said first data transfer protocol comprises a so-called CAN protocol.

7. A system as set forth in claim 4, wherein said second data transfer protocol (IWS) comprises a simplified version of the first data transfer protocol, wherein the information package representing each function contains fewer elements or is lower in frequency that the information packages of the first data transfer protocol.

8. A system as set forth in claim 1, wherein, in at least some of the nodes (19), each individual node is provided with a number of node configurations representing various function modes of the system, which include three or more of the following function modes: a normal condition function mode, a test function mode, an abnormal condition function mode, a service condition function mode, and a 00-function mode in which the node does nothing until a command comes from the adapter (3).

9. A system as set forth in claim 1, wherein said second cable (6, 7) includes a number of cable branches, the ends of which connect to junction modules (2a) which, being coupled to each other, constitute a power supply to the current lines of cable branches (4–7) and combine the data lines (9) of the second-level cable branches (6, 7) for a data bus, whereby the nodes (19) of the separate cable branches (6, 7) are also in a direct data transfer communication with each other.

10. A system as set forth in claim 1, wherein said data transfer communication occurring through the adapter (3) between the data buses (9', 9) using various data transfer protocols (CAN, IWS) is limited to the transfer of only such control messages which carry an indication or an address designating this transfer.

11. A system as set forth in claim 1, wherein the system includes two adapters (3, 3b) provided with identical functions and memories, wherein the adapter in active mode transmits regularly a message, the absence of which activates the other adapter to function.

* * * * *